United States Patent
Pioch

(10) Patent No.: US 6,376,772 B1
(45) Date of Patent: *Apr. 23, 2002

(54) BUSBAR BUSHING DEVICE AND BAR LEAD-IN

(75) Inventor: Olivier Pioch, Nice (FR)

(73) Assignee: Pioch S.A., Carros Cedex (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/267,622

(22) Filed: Mar. 15, 1999

(30) Foreign Application Priority Data

Mar. 18, 1998 (FR) .............................. 98 03319

(51) Int. Cl.[7] .................................. H02G 5/00
(52) U.S. Cl. .............. 174/70 B; 174/65 G; 174/152 G; 174/153 G
(58) Field of Search .................. 174/65 G, 153 G, 174/152 G, 152 R, 70 B, 71 B, 72 B, 68.2, 99 R, 151

(56) References Cited

U.S. PATENT DOCUMENTS

| 2,225,472 A | 12/1940 | Franklin | 173/322 |
|---|---|---|---|
| 2,707,723 A | * 5/1955 | Moorhead | 174/153 |
| 2,800,526 A | * 7/1957 | Moorhead | 174/153 |
| 2,806,080 A | * 9/1957 | Corey | 174/153 |

FOREIGN PATENT DOCUMENTS

| CH | 201 408 | 2/1939 |
|---|---|---|
| FR | 2 545 641 | 11/1984 |
| FR | 2 633 439 | 12/1989 |

* cited by examiner

Primary Examiner—Dean A. Reichard
Assistant Examiner—W. David Walkenhorst
(74) Attorney, Agent, or Firm—Jacobson Holman, PLLC

(57) ABSTRACT

The invention concerns a busbar bushing device (10) adapted to be mounted through an orifice (O) in a wall (P) and to have a conductive busbar (12) passed through it, of the type including a body (14) through which a conduit (20) for receiving said busbar (12) passes completely and a cover (16) attached to said body (14). The cover (16) includes an opening (24) through which said busbar (12) passes and which extends the conduit (20) of the body (14). The opening (24) in the cover (16) is bordered externally by an elastically deformable peripheral lip (26) adapted to be pressed in a sealed manner all around the contour of the conductive busbar (12).

10 Claims, 2 Drawing Sheets

BUSBAR BUSHING DEVICE AND BAR LEAD-IN

Figure 1:
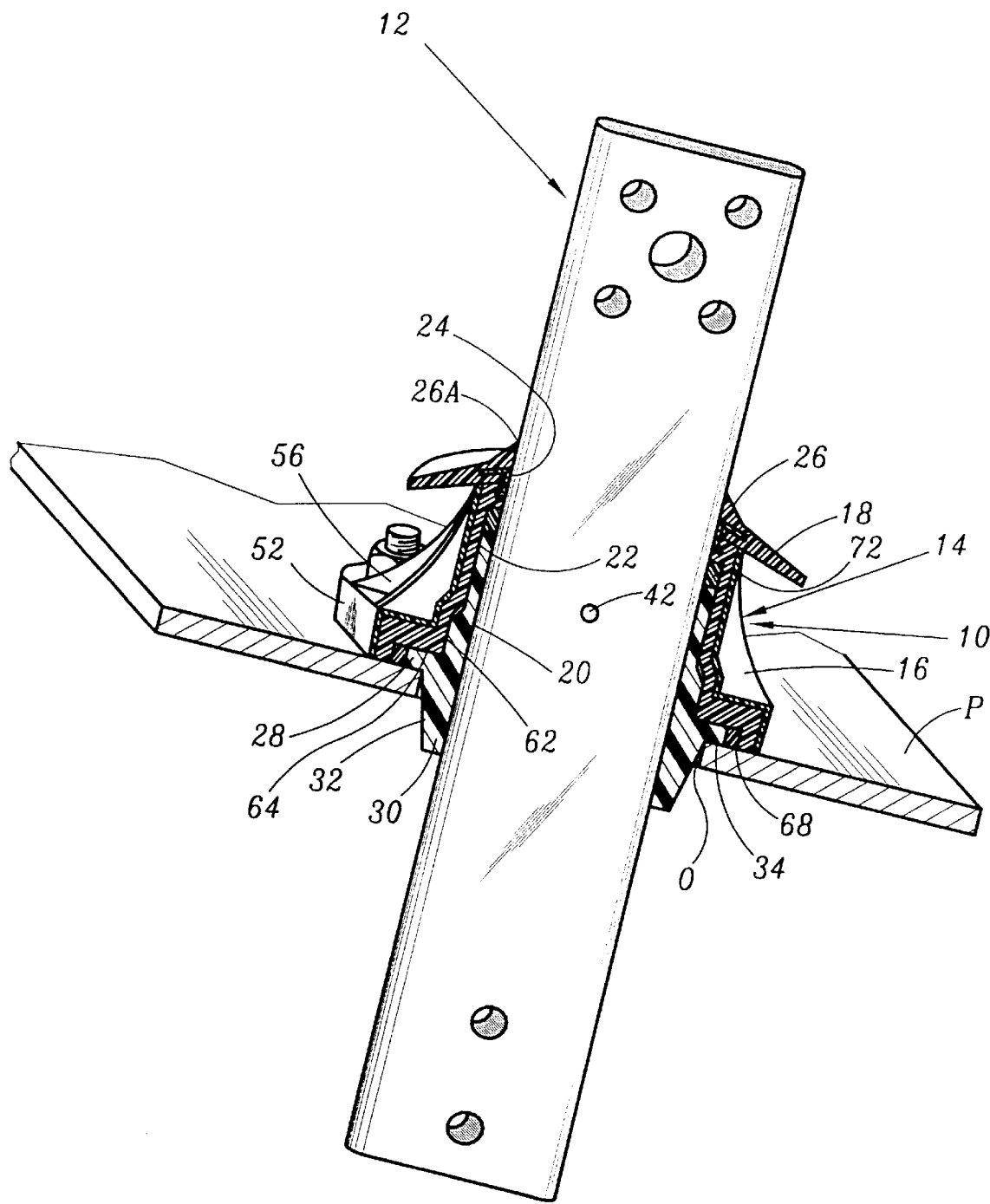

The present invention concerns a busbar bushing device adapted to be mounted through an orifice formed in a wall for a conductive busbar to pass through, of the type including a body through which a conduit for receiving said busbar passes completely and a cover attached to said body, said cover including an opening through which said busbar passes and which is aligned with the conduit in the body.

It also concerns a bar lead-in.

Busbar bushing devices are used to pass an electrical line, in particular a high-current line, through a wall, for example a wall of a transformer housing.

Bar lead-ins are therefore formed of a busbar bushing device and a conductive busbar. For busbars of oblong section, and in particular of substantially rectangular section, busbar bushing devices are currently made of plastics material. The bar lead-in must be used under a cover or inside a part protected from inclement weather, the materials used in prior art structures having poor resistance to external attack. In particular, said busbar bushing devices do not provide an adequate seal.

Prior art bar lead-ins that withstand exposure to inclement weather out-of-doors include busbar bushing devices, known in this case as rod bushing devices, made of porcelain. Because of how they are made, these rod bushing devices accept only a circular section conductive rod. Moreover, they are costly. Finally, they are fragile and cannot withstand significant bending of the conductive rod.

An aim of the invention is to propose a low-cost busbar bushing device that can be exposed to inclement weather out-of-doors and can receive a busbar of oblong, in particular rectangular, section.

To this end, the invention consists in a busbar bushing device of the aforementioned type characterized in that the opening in the cover is bordered externally by an elastically deformable peripheral lip adapted to be pressed in a sealed manner all around the contour of the conductive busbar.

In particular embodiments of the invention, the busbar bushing device has one or more of the following features:

- the lip is in one piece with at least part of the cover;
- the cover has a rigid inner structure and the lip is moulded onto said rigid structure;
- the lip is in one piece with an insulative coating covering at least the greater part of the outside surface of the cover;
- said passage and the opening have substantially identical oblong sections;
- the body has, in a region covered by the cover, a transverse bore opening into said passage, which bore is adapted to receive a pin for retaining the conductive busbar which itself includes a bore for the end of the pin, the cover trapping the pin when fitted to the body;
- the body has a peripheral flange adapted to bear on one face of the wall, the cover includes means for fixing it to the wall and is in the form of a cap covering at the same time the greater part of the body and the peripheral flange, and an O-ring is disposed around the peripheral flange, against the wall, in a housing in the cover;
- the cover includes a housing to receive the greater part of the body, the housing being extended by the opening, and the housing includes, over at least a part of its length, a portion which has a section which increases progressively towards the opening and which is adapted to guide an O-ring disposed between the body and the cover and to compress it in the housing when fitting the cover to the body.

The invention further consists in a bar lead-in characterized in that it includes a conductive busbar and a busbar bushing device as defined hereinabove.

Figure 2:
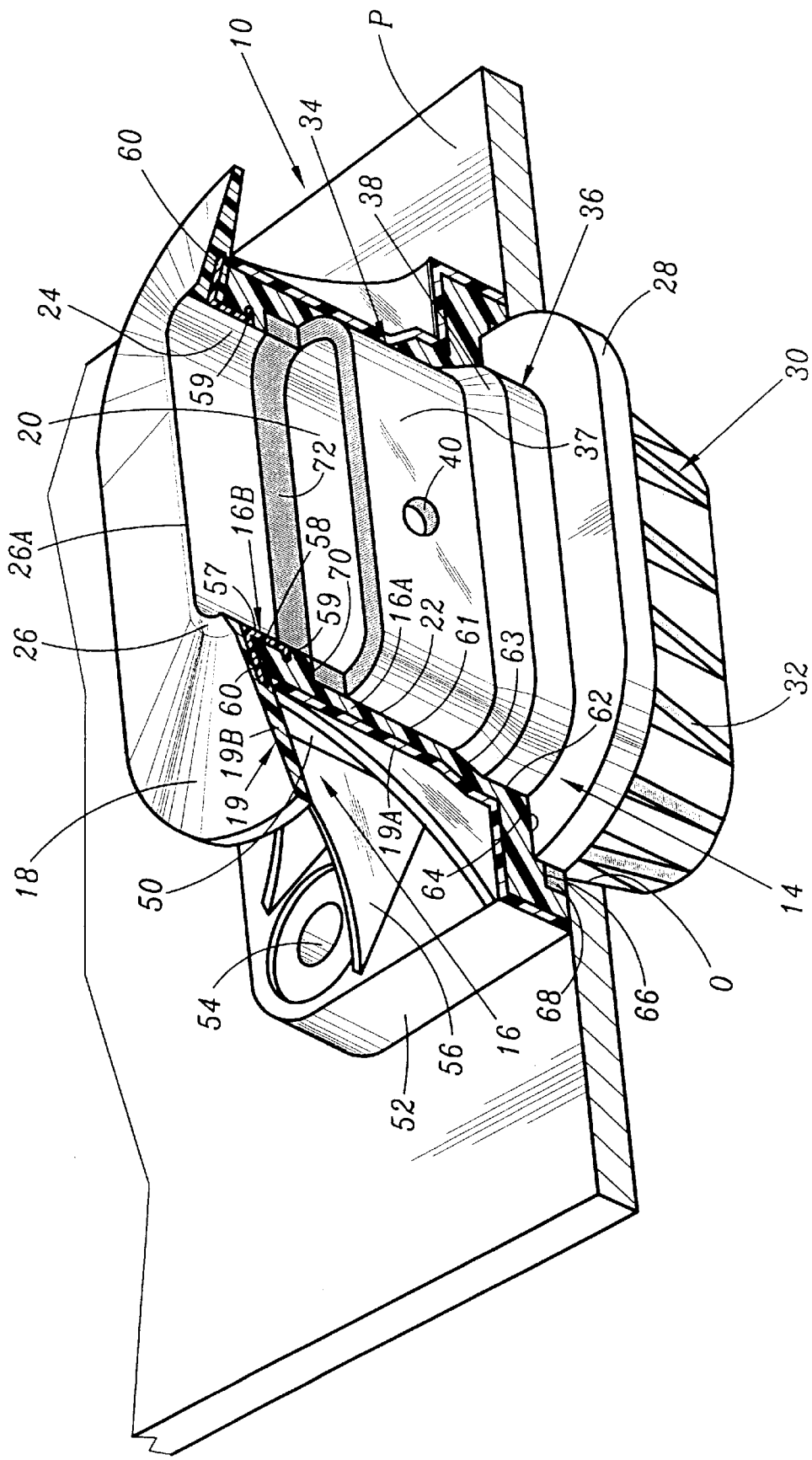

The invention will be better understood after reading the following description which is given by way of example only and with reference to the drawings, in which:

FIG. 1 is a sectional three-quarter view of a bar lead-in in accordance with the invention; and FIG. 2 is a part-sectional perspective view of the busbar bushing device of the bar lead-in from FIG. 1.

The bar lead-in shown in FIG. 1 comprises a busbar bushing device 10 and a conductive busbar 12. The busbar bushing device 10 comprises a body 14 and a cover 16 with an external flange 18 at the top.

Alternatively, the cover 16 can have a plurality of stacked flanges at the top along part of the length of the conductive busbar 12.

The body 14 and the cover 16 have shapes that are substantially axisymmetrical with respect to the longitudinal direction of the busbar 12. They are essentially made of a thermoplastics material, for example polyamide, polybutylene terephthalate or "PEEK". The outside or exposed surface of the cover 16 is totally covered with a protective and insulative coating 19.

The conductive busbar 12 is rectilinear and has an oblong section, for example rectangular with its shorter sides rounded. It is made from non-ferrous metal and is drilled at each end for connecting electrical cables.

A conduit 20 which receives the conductive busbar 12 passes completely through the body 14.

The cover 16 is bell-shaped and delimits internally a housing 22 that receives the greater part of the body 14. The housing 22 is extended at the top end of the cover 16 by an opening 24 through which the conductive busbar 12 passes. The section of this opening is substantially equal to the section of the busbar 12.

The opening 24 is bordered externally by an elastically deformable peripheral lip 26 adapted to be pressed in a sealed manner onto the contour of the conductive busbar 12. The lip 26 is in one piece with the covering 19 of the cover 16.

The body 14 and the cover 16 are adapted to be disposed on the same side of a wall P through which there is an opening O, as shown in FIGS. 1 and 2.

To this end, the body 14 is essentially in the form of a sleeve and the conduit 20 inside it is of constant section. The inside section of the conduit 20 is very slightly larger than the section of the conductive busbar 12.

The middle part of the body 14 has a flange 28 on the outside which bears on the outside surface of the wall P. This flange divides the body axially into a part adapted to pass through the wall P and a part adapted to be received in the cover 16.

The body 14 includes a collar 30 at the same end as the flange 28 adapted to pass through the orifice O and to project inside the housing delimited by the wall P. The collar delimits the conduit 20. The collar is stiffened externally by longitudinal ribs 32 evenly distributed around its periphery.

The height of the ribs 32 decreases progressively from the flange 28 to the free end of the collar 30 to guide the body 14 when it is inserted into the orifice O. In the immediate vicinity of the flange 28 the height of the ribs 32 is less than the width of the flange 28 and so a peripheral bearing surface 34 is formed between the ribs 32 and the outside contour of the flange 28.

On the other side of the flange 28 the body 14 is defined by an oblong section tubular extension 34 delimiting the conduit 20. In the region where it joins to the flange 28, the tubular extension 34 has an exterior peripheral portion 36 of increased thickness. This is connected to the main portion 37 of the extension 34 by a portion 38 of progressively reducing thickness forming a peripheral chamfer. In the example described the portion 38 is substantially frustoconical.

The reduced thickness main portion 37 of the extension 34 has a radial bore 40 in a plane face. The bore 40 opens into the interior of the conduit 20. It is adapted to receive the end of a pin, not shown, adapted to retain the busbar 12 in the axial direction. The other end of the pin is received in a transverse bore 42 in the busbar aligned with the bore 40.

To make it easier to mould, the cover 16 is formed of two parts that interengage elastically with each other. Thus it includes a trunk 16A capping the body 14 and an attached annular ring 16B defining the flange 18.

The trunk 16A has a tubular wall 50 surrounding the tubular extension 34. The lower end of the tubular wall 50 in contact with the outside surface of the wall P includes a fixing base 52. Its other end carries the flange 18.

The base 52 is substantially rectangular in shape with rounded corners. The corners are drilled with holes 54 to receive fixing bolts.

Triangular stiffener gussets 56 join the exposed surface of the base 52 to the tubular wall 50. The gussets 56 start at the base of the flange 18. They have a height that increases progressively as far as the base 52.

The whole of the exposed outside surface of the trunk 16A is covered by a portion 19A of the coating covering all of the cover 16.

The flange 18 has a substantially oval oblong outside contour. It is slightly inclined towards the base 52 and extends over substantially the greater part of its surface.

The flange is formed by the annular ring 16B covered by a portion 19B of the covering 19.

The annular ring 16B includes a skirt 57 delimiting part of the opening 24 through which the rod 12 passes. This skirt is received in a spot facing 58 formed at the open end of the portion of the opening 24 delimited by the trunk 16A. The end of the skirt 57 received in the spot facing 58 has an outside peripheral bead 59 adapted to engage elastically in a complementary annular groove in the trunk 16A.

The other end of the skirt 57 is bordered by a radial outer ring 60. The ring 60 constitutes a rigid core for the flange 18, the remainder of which is formed by the coating 19B.

The deformable lip 26 is an outside bead bordering the opening 24. The bead has a sharp edge 26A at the top defining a peripheral crest limiting the bearing area on the conductive busbar 12. The sharp edge 26A is aligned with the inside surface of the skirt 57 delimiting the opening 24.

The section of the housing 22 in the cover decreases progressively from the base 52 to the deformable lip 26. The main portion of the housing 22 includes a principal portion 61 which has a section which is very slightly greater than that of the tubular extension 34.

At the level of the base 52 the principal portion 61 is extended by a widened portion 62 adapted to receive the increased thickness portion 36 of the body. The widened portion 62 is joined to the principal portion 61 by a portion 63 of progressively decreasing section having a substantially frustoconical profile converging towards the top of the cover 16. This portion defines a chamfer corresponding to the chamfer defined by the portion 38.

The end of the housing 22 that opens through the base 52 has two successive spot facings 64, 66, the narrower of which is adapted to receive the flange 28 and the wider of which is adapted to receive the flange 28 and an O-ring 68 disposed around it. The O-ring 68 is adapted to bear simultaneously on the cover 16, the body 14 and the outside surface of the wall P.

The principal portion 58 is longer than the tubular extension 34. It terminates at the level of the opening 24 which with the portion 58 defines a shoulder 70.

An O-ring 72 is disposed between the shoulder 70 and the front end of the tubular extension 34. The O-ring 72 is adapted to be pressed simultaneously against the body 14, the cover 16 and the conductive busbar 12 when the latter is retained in the busbar bushing device, as shown in FIG. 1. In a variant that is not shown the single O-ring 72 is replaced by a stack of O-rings.

In accordance with the invention, the lip 26 is made from a deformable material, for example an insulative elastomer such as "silicone", "neoprene" or "nitrile" elastomer. In particular, the lip 26 is in one piece with the coating 19B covering the annular ring of the cover. The cover 16 is therefore formed by a rigid inner structure, made from a rigid plastics material, for example, onto which the lip 26 is moulded, around the opening 24. The lip 26 is therefore extended onto the flange 18 and onto the whole of the outside surface of the cover 16 through the intermediary of the insulative coating 19A.

To fit a bar lead-in of the above kind the conductive busbar 12 is passed through the conduit 20. It is immobilized therein by fitting a pin, not shown, into the aligned bores 40 and 42. The body 14 is then inserted through the opening O. The O-ring 68 is fitted around the flange 28 in contact with the outside surface of the wall P.

The O-ring 72 is inserted into the housing 22 formed in the cover 16. To be more precise, the O-ring 72 is placed temporarily in the portion 62 of slightly greater width than the principal portion 61.

The cover 16 is then fitted around the busbar 12 and the exterior part of the body 14. When the cover 16 is pushed onto the tubular extension 34, the O-ring 72 is progressively pushed along the principal portion 61 as far as the shoulder 70. During this movement the convergent surface 63 assists the insertion of the O-ring 72 and in particular its radial compression.

When the base 52 is bearing on the outside surface of the wall P, bolts are inserted through the bores 54 to immobilize the cover 16. The cover presses the body 14 against the wall P and holds it there through the intermediary of the compressed O-ring 72. The projecting parts of the bolts are advantageously covered with insulative caps.

Clearly, when the cover 16 is covering the tubular wall 34, the pin inserted into the aligned bores 40 and 42 is trapped inside the rod bushing device, and the busbar 12 is therefore fixed axially.

This means of retaining the busbar 12 enables replacement of the O-rings 68 and 72 by simply removing the cover 16, without it being necessary to withdraw the pin retaining the conductive busbar axially.

When the rod bushing device is assembled, the O-ring 68 is initially disposed around the flange 28. The latter holds the O-ring 68 in position while fitting the cover 16. Thus it is not necessary to position the O-ring 68 Initially in the spot facing 64 of the cover 16, which would entail holding it in place by means of an adhesive.

Because the outside peripheral lip 26 is made of a deformable material, it is pressed directly onto the outside surface of the busbar 12, guaranteeing a reliable seal of the bar lead-in.

Because the lip 26 is extended by the insulative external coating, the cover offers good resistance to inclement weather. The cover 16 can therefore be used out-of-doors without any particular additional protection.

The part of the body 14 projecting outwards from the wall P Is entirely capped by the cover 16. Thus the body does not require any protective coating against inclement weather.

A bar lead-in like that described here can conduct a current in excess of 1000 A at a low-tension voltage of 380 V or a medium-tension voltage in the order of 20000 V.

What is claimed is:

1. Busbar bushing device (10) adapted to be mounted through an orifice (O) in a wall (P) and to have a conductive busbar (12) passed through it, of the type including a body (14) through which a conduit (20) for receiving said busbar (12) passes completely and a cover (16) formed separately of and fitted around the exterior of said body and attached to said body (14), said cover (16) including an opening (24) through which said busbar (12) passes and having a longitudinal axis which extends the conduit (20) of said body (14), characterized in that the opening (24) in the cover (16) is bordered externally by an elastically deformable external peripheral lip (26) extending perpendicularly outwardly from said longitudinal axis and parallel to said longitudinal axis away from said body, said external peripheral lip adapted to be pressed in a sealed manner around the contour of the conductive busbar (12).

2. Device according to claim 1, characterized in that the lip (26) is in one piece with at least part of the cover (16).

3. Device according to claim 2, characterized in that the lip (26) is in one piece with an insulative coating covering at least the greater part of the outside surface of the cover (16).

4. Device according to claim 1, characterized in that he cover (16) has a rigid inner structure and the lip (26) is moulded onto said rigid structure.

5. Device according to claim 3, characterized in that the lip (26) is in one piece with an insulative coating covering at least the greater part of the outside surface of the cover (16).

6. Device according to claim 1, characterized in that said conduit (20) and the opening (24) have substantially identical oblong sections.

7. Device according to claim 1, characterized in that the body (14) has, in a region (34) covered by the cover (16), a transverse bore (40) opening into said conduit (20), which bore (40) is adapted to receive a pin for retaining the conductive busbar (12) which itself includes a bore (42) for the end of the pin, the cover (16) trapping the pin when fitted to the body (14).

8. Device according to claim 1 characterized in that the body (14) has a peripheral flange (28) adapted to bear on one face of the wall (P), in that the cover (16) includes means (54) for fixing it to the wall (P) and is in the form of a cap covering at the same time the greater part of the body (14) and the peripheral flange (28), and in that an O-ring (68) is disposed around the peripheral flange (28), against the wall (P), in a housing (66) in the cover (16).

9. Device according to claim 1, characterized in that the cover (16) includes a housing (22) adapted to receive the greater part of the body (14), the housing (22) being extended by the opening (24), and in that the housing (22) includes, over at least a part of its length, a portion (63) which has a section which increases progressively towards the opening (24) and which is adapted to guide an O-ring (72) disposed between the body (14) and the cover (16) and to compress it in he housing (22) when fitting the cover (16) to the body (14).

10. Bar lead-in, comprising:

a conductive busbar (12); and a busbar bushing device (10) adapted to be mounted through an orifice (O) in a wall (P) and to have said conductive busbar (12) passed through it, the busbar bushing device being of the type including a body (14) through which a conduit (20) for receiving said busbar (12) passes completely and a cover (16) attached to said body (14), said cover (16) including an opening (24) through which said busbar (12) passes and having a longitudinal axis which extends the conduit (20) of said body (14), characterized in that the opening (24) in the cover (16) is bordered externally by an elastically deformable external peripheral lip (26) extending perpendicularly outwardly from said longitudinal axis and parallel to said longitudinal axis away from said body, said external peripheral lip adapted to be pressed in a sealed manner around the contour of the conductive busbar (12).

* * * * *